UNITED STATES PATENT OFFICE.

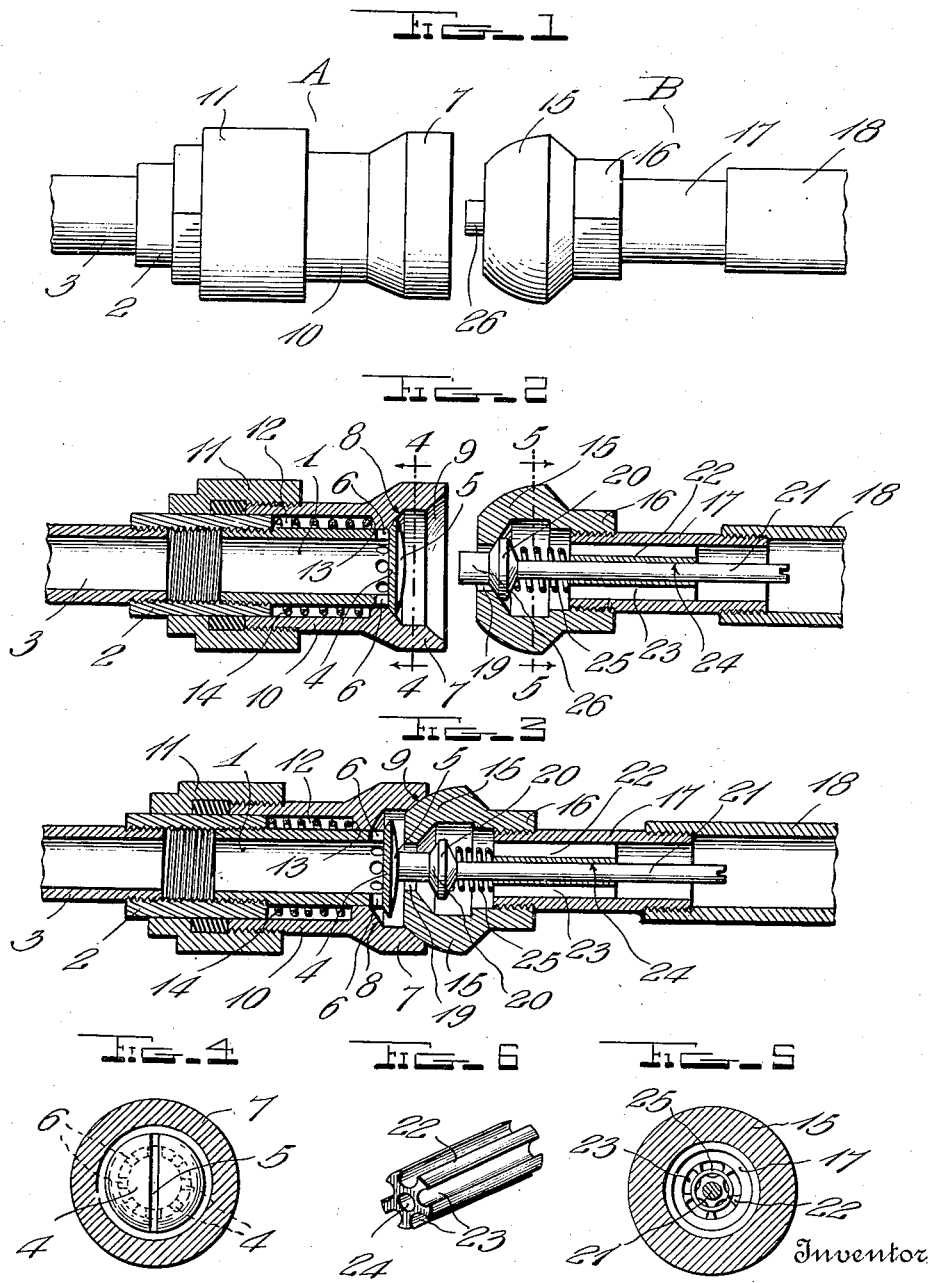

HENRY UHL, OF ALBANY, OREGON.

AUTOMATIC TRAIN-PIPE-COUPLING VALVE.

1,205,686.     Specification of Letters Patent.     Patented Nov. 21, 1916.

Application filed January 20, 1916. Serial No. 73,212.

*To all whom it may concern:*

Be it known that I, HENRY UHL, a citizen of the United States, residing at Albany, in the county of Linn and State of Oregon, have invented certain new and useful Improvements in Automatic Train-Pipe-Coupling Valves; and I do declare the following to be a full, clear, and exact description of the invention, such as will enable others skilled in the art to which it appertains to make and use the same.

This invention relates to improvements in the valves used in the couplings of train pipes which are carried by railway cars to conduct air, steam or other fluids to brake devices, heaters, etc.

The principal object of the present invention is to provide a device of this character which will automatically cut off the passage of air or steam through the pipes when the cars have been uncoupled, and allow air or other fluid to flow when said cars come into engagement.

An additional object of the invention is to provide a simply constructed device of this character which, while it can be very inexpensively manufactured, will be very efficient in operation.

With the above and other objects in view, the invention resides in certain novel features of construction, and the combination and arrangement of parts which will hereinafter be more particularly described and claimed and shown in the drawings wherein:

Figure 1 represents a side elevation of the two parts forming my improved coupling; Fig. 2 is a central vertical longitudinal section of the parts shown in Fig. 1; Fig. 3 is a similar view showing the valves connected so that the air or other fluid can readily pass from one section to another; Figs. 4 and 5 are detail transverse sections taken on the lines 4—4 and 5—5 of Fig. 2; Fig. 6 is a detail perspective view of the guide used in one of the sections to support the valve stem.

My invention comprises broadly two coöperating parts A and B which are carried by the railway cars in such position that when said cars come together to be coupled, the two parts will automatically engage to allow the passage of air or other fluid therethrough. The section A comprises a hollow valve stem 1 which is connected by a sleeve coupling 2 to the line pipe 3 which extends the length of the car and conducts the air, the adjacent ends of the valve stem 1 and the line pipe 3 being externally threaded to receive the internal threads on the sleeve 2. The opposite end of the valve stem 1 is provided with a head 4 of slightly greater diameter than the diameter of the stem 1, said head being slightly convex as shown and provided with a groove 5. The head 4 is also provided with a plurality of outlet openings 6 adjacent its connection with the stem 1, said openings communicating with the hollow stem 1, to allow the air contained therein to escape through said openings. These openings 6 are normally closed by a socket member 7 which is provided with a valve seat 8 in which the head or valve 4 is disposed, said openings being closed by this seat so long as the parts remain in close contact. The socket member is provided with a flared outer end 9 while its opposite end has a sleeve 10 formed thereon surrounding said valve stem 1, the free end of said sleeve 10 being screw threaded for engagement with the packing gland 11. The sleeve 10 is provided with a recess 12, thus providing an interior annular shoulder 13 against which one end of an expansion helical spring 14 abuts, the opposite end of said spring contacting with one end of the sleeve 2. This arrangement causes the socket member to be moved outwardly so that the valve 4 will be normally seated in the seat 8, and the outlet openings 6 closed. It will be seen, however, that when said socket member is forced inwardly, by any means, the openings 6 will not be covered and thus the air or other fluid will escape.

The coöperating or male section B comprises a ball member which has a substantially spherical head 15 for engagement with the flared end 9 of the socket member, said head having an internally threaded boss 16 extending therefrom for engagement with a tube 17. The opposite end of the tube is also threaded for engagement with the line pipe 18 which extends along the bottom of the other car. The head 15 has an opening 19 formed therein substantially in its center which is provided with inwardly inclined walls to form a valve seat for the valve 20 which is disposed within said head.

Extending from the valve 20 is a rather long stem 21 which projects through the head 15 and into said tube 17 where it is guided by the guide spider 22. The construction of this spider is best disclosed in Fig. 6 and it will be seen that it comprises a cylinder having a plurality of grooves 23 in its periphery through which the air or other fluid passes on its way to the line pipes. The spider 22 is also provided with a bore 24 to receive said stem 21. It is obvious that any other preferred form of guide could be used with equal facility for positioning the valve 20. In order to maintain said valve 20 in engagement with its seat I provide a helical expansion spring 25 which surrounds said stem 21 and contacts with the valve 20 and one end of the spider 22.

When the sections A and B are disposed as shown in Figs. 1 and 2, the cars carrying the same have not come together and therefore air or other fluid which is contained in the line pipes 3 and 18 cannot escape because the expansion springs normally maintain the valves in closed position. When, however, the two cars are coupled, the sections A and B come together, the head 15 of the section B forcing the socket member 7 inwardly until the extension 26 on the valve 21 contacts with the head or valve 4 when said valve 20 will be forced open. It is obvious that as soon as the socket member has been forced inwardly on the tube or hollow valve stem 1, the outlets 6 will be opened, thus allowing the air or other fluid to pass out of said openings and through the opening 19 into the section B or vice versa.

From the foregoing description taken in connection with the accompanying drawings, it will be readily evident that I have invented a very simple and very efficient coupling valve for train pipes which will be automatic in their operation. While this device is designed primarily for use on railway cars, it is obvious that it can be put to many other uses to great advantage.

I claim as my invention:

1. In a device of the class described, a male member having an opening in the end thereof, a valve in said member and having one end projecting through said opening, a tube provided with a closed end and having a plurality of outlet openings adjacent said end, said tube being relatively stationary and connected with a line pipe, a socket member slidable on said tube and normally closing said outlet openings, means for holding said socket member in position to close said openings, said socket member sliding on said tube to open said outlet openings when engaged by said male member, the valve in said latter member being simultaneously opened when its outwardly projecting end contacts with said closed end of the tube.

2. In a device of the class described, a male member, a valve provided with a plurality of outlet openings and having a hollow stem, a socket member slidable on said stem and having a seat therein to receive said valve and close said outlet openings, said socket member also having an annular shoulder, an annular shoulder on said valve stem, a coil spring having its opposite ends contacting with said shoulders to normally close said outlet openings, said male member contacting with said socket member to move the same to open the valve.

3. In a device of the class described, a male member, a valve provided with a plurality of outlet openings in its side and having a hollow stem, its interior communicating with said openings, a sleeve coupling said stem to the line pipe, a socket member slidable on said stem and having a seat therein to receive said valve and close the said outlet openings, said socket member also having an annular recess to form an annular shoulder, a coil spring surrounding said stem, its opposite ends contacting with said shoulder and the end of said sleeve to normally close said outlet openings, said male member contacting with said socket member to move the same on the stem to open the valve.

4. In a device of the class described, a male member comprising a spherical head provided with an opening in its outer face, said opening forming a valve seat, a tube extending from the opposite end of said head, a valve within said head for coaction with said seat and having a stem extending into said tube, a spring for maintaining the valve in normally closed position, an additional tube provided with a closed end, a socket member slidable on said additional tube, said valve contacting with said closed end to open the same when the male member abuts said socket member.

5. In a device of the class described, a male member comprising a spherical head provided with an opening in its outer face, said opening forming a valve seat, a tube extending from the opposite side of said head, a guide within said tube, a valve on said head for coaction with said seat, a stem on said valve extending through said guide, a coil spring surrounding said stem, one end contacting with said guide and the other end with said valve to normally close the same, an additional tube provided with a closed end, a socket member slidable on said additional tube, said valve contacting with said closed end to open the same when the male member abuts said socket member.

In testimony whereof I have hereunto set my hand in presence of two subscribing witnesses.

HENRY UHL.

Witnesses:
L. L. SWAN,
J. R. METZGER.